(12) United States Patent
Nakamoto

(10) Patent No.: US 7,796,897 B2
(45) Date of Patent: Sep. 14, 2010

(54) WDM OPTICAL TRANSMISSION SYSTEM AND WDM OPTICAL TRANSMISSION METHOD

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 668 days.

(21) Appl. No.: 11/882,098

(22) Filed: Jul. 30, 2007

(65) Prior Publication Data

US 2008/0075463 A1 Mar. 27, 2008

(30) Foreign Application Priority Data

Sep. 21, 2006 (JP) .............................. 2006-255345

(51) Int. Cl.
*H04J 14/02* (2006.01)

(52) U.S. Cl. .................. 398/185; 398/79; 398/91; 398/183; 398/187; 398/188; 398/189

(58) Field of Classification Search ................ 398/79, 398/91, 183, 185, 187, 188, 189
See application file for complete search history.

(56) References Cited

U.S. PATENT DOCUMENTS

| | | | | |
|---|---|---|---|---|
| 5,566,381 | A * | 10/1996 | Korotky | 398/147 |
| 6,134,037 | A * | 10/2000 | Shabeer et al. | 398/157 |
| 6,614,567 | B1 * | 9/2003 | Al-Salameh et al. | 398/79 |
| 7,085,500 | B2 * | 8/2006 | Spickermann | 398/185 |
| 2004/0008403 | A1 * | 1/2004 | Kondoh et al. | 359/326 |
| 2004/0223766 | A1 * | 11/2004 | Lanne et al. | 398/183 |
| 2006/0029398 | A1 * | 2/2006 | Liu et al. | 398/188 |
| 2006/0062577 | A1 * | 3/2006 | Miura et al. | 398/82 |
| 2007/0183787 | A1 * | 8/2007 | Cai et al. | 398/147 |
| 2007/0206898 | A1 * | 9/2007 | Wang et al. | 385/24 |
| 2007/0206960 | A1 * | 9/2007 | Nissov et al. | 398/188 |
| 2008/0226295 | A1 * | 9/2008 | Miura et al. | 398/79 |
| 2009/0028552 | A1 * | 1/2009 | Zhang et al. | 398/25 |
| 2009/0162059 | A1 * | 6/2009 | Nakamoto | 398/48 |

FOREIGN PATENT DOCUMENTS

| | | |
|---|---|---|
| JP | 7-66779 | 3/1995 |
| JP | 2000-183815 | 6/2000 |

OTHER PUBLICATIONS

Keang et al "Cross-Phase Modulated-Induced Crosstalk for RZ-SPSK Signals in Dispersive Transmission Systems" Jan. 2006, Journal of Lightwave Technology, vol. 24, No. 1, pp. 396-403.*
J.X. Cai et al., "RZ-SPSK Field Trail Over 13100 km of Installed Non-Slope-Matched Submarine Fibers", Journal of Lightwave Technology, vol. 23, No. 1, Jan. 2005, pp. 95-103.

* cited by examiner

*Primary Examiner*—Ken N Vanderpuye
*Assistant Examiner*—Tanya Ngo
(74) *Attorney, Agent, or Firm*—Staas & Halsey LLP

(57) ABSTRACT

A WDM optical transmission system of the invention: detects an optical waveform of an intensity-modulated optical signal adjacent to a phase-modulated optical signal in a wavelength range; calculates a phase modulation drive waveform for canceling XPM of the phase-modulated optical signal affected by the adjacent intensity-modulated optical signal in the optical transmission path, based on the detected result; and additionally phase-modulates the phase-modulated optical signal synchronously with the adjacent intensity-modulated optical signal, according to the drive waveform, to thereby compensate the XPM. As a result, excellent transmission characteristics can be realized.

15 Claims, 10 Drawing Sheets

(HORIZONTAL AXIS: WAVELENGTH)

(HORIZONTAL AXIS: TIME)

INITIAL CONFIGURATION (HORIZONTAL AXIS: WAVELENGTH)

PHASE CHANGE PROVIDED TO ADJACENT CHANNEL BY RZ SIGNAL

PHASE CHANGE PROVIDED TO ADJACENT CHANNEL
BY RZ-DPSK SIGNAL

PHASE CHANGE OF RZ-DPSK SIGNAL
RECEIVED FROM RZ SIGNAL

WDM OPTICAL TRANSMISSION SYSTEM AND WDM OPTICAL TRANSMISSION METHOD

BACKGROUND OF THE INVENTION

1. Field of the Invention

The present invention relates to a WDM optical transmission system and a WDM optical transmission method for transmitting a wavelength division multiplexing (WDM) signal light including a plurality of different wavelengths. More specifically, the present invention relates to a technique for reducing deterioration of transmission characteristics due to interaction between an intensity-modulated optical signal and a phase-modulated optical signal.

2. Related Art

There is a demand for an increase in transmission capacity of, for example, submarine optical cable systems, accompany the increase in communication traffic. To meet such demands, it can be generally considered to lay a new submarine optical cable and construct a submarine terminal. There is another method of newly adding a submarine terminal to an optical cable (dark fiber), which has been laid already but not used. An upgrade method is also known, in which the transmission capacity is increased at a low cost by newly adding an optical channel to an already introduced optical communication device.

The above upgrade method includes a method of increasing the optical channels by connecting an optical transmitter and an optical receiver to vacant ports of a multiplexer and a branching filter in an existing WDM optical transmission device. Moreover, there is another method in which optical branches are respectively provided on a transmission side and a reception side of the terminals corresponding to existing optical signals (optical channels) CH1 to CH4, as shown in FIG. 11, relative to an initial configuration of the WDM optical transmission system such as shown in FIG. 10, to increase terminals corresponding to the new optical channels CH5 to CH8. FIG. 12 shows an arrangement example in a wavelength range of the existing optical channels CH1 to CH4 and the new optical channels CH5 to CH8 in such an upgrade method. In this example, optical channels CH5 and CH6 to be increased are arranged on a short wavelength side of the existing optical channels CH1 to CH4, and optical channels CH7 and CH8 to be increased are arranged on a long wavelength side of the existing optical channels CH1 to CH4.

Incidentally, in a system for overland communications, Non Return to Zero (NRZ) format is generally used as the optical signal modulation method, whereas in a system for submarine communications, Return to Zero (RZ) format is generally used as the optical modulation method. In the RZ format, the optical transmitter has a complicated configuration, but has an advantage in that reception sensitivity is excellent and signal deterioration is relatively small even when the optical fiber is used for long-distance transmission.

A phenomenon causing the signal deterioration in the WDM optical transmission system using the RZ format optical signal is attributable to a non-linear effect of the optical fiber, and specifically, the phenomenon includes self phase modulation (SPM) and cross phase modulation (XPM). The SPM is a phenomenon in which a refractive index of the optical fiber changes corresponding to the power of the optical signal propagating on the optical fiber, thereby applying phase modulation to the optical signal. Since the spectrum of the optical signal expands due to the phase modulation, the waveform of the optical signal is distorted corresponding to a dispersion characteristic of the optical fiber. Moreover, the XPM is a phenomenon in which the refractive index of the fiber changes due to the optical power of the optical channels having adjacent wavelengths, thereby applying phase modulation to the optical signal, and the wavelength of the optical signal is distorted corresponding to the dispersion characteristic of the optical transmission path.

As a technique for suppressing this deterioration of the WDM signal light due to the XPM, there is a technique for suppressing generation of the XPM by arranging the wavelength of the optical transmitter so that bit patterns of optical signals having wavelengths adjacent to each other cause walk-off of at least a ½ bit period relative to each other in an effective length of the optical fiber (for example, refer to Japanese Unexamined Patent Publication No. 7-66779). Moreover a technique in which different chromatic dispersion is imparted to optical signals having wavelengths adjacent to each other at the time of transmission, and the chromatic dispersion thereof and chromatic dispersion of the optical transmission path are compensated on the reception side, to thereby suppress crosstalk between adjacent optical signals is also known (for example, refer to Japanese Unexamined Patent Publication No. 2000-183815).

As the non-linear effect of the optical fiber, there is also four wave mixing (FWM), other than the above described SPM and XPM. The occurrence of FWM can be avoided by giving an appropriate difference in the propagation speed between respective optical channels of the WDM signal light. Specifically, by using, for example, an optical fiber having chromatic dispersion of about −2 ps/nm/km, the occurrence of FWM can be avoided.

Moreover, in relation to the modulation method of the optical signal, recently, to improve the reception sensitivity further, application of a differential phase shift keying (RZ-DPSK) format in which information is carried on an optical phase is being studied (for example, refer to J. -X. Cai et al., "RZ-DPSK Field Trial Over 13100 km of Installed Non-Slope-Matched Submarine Fibers", Journal of Lightwave Technology, Vol. 23, No. 1, January 2005, pp 95-103). In this RZ-DPSK format, the configuration of the optical transmitter/receiver becomes more complicated as compared to the RZ format, however, it is expected that the reception sensitivity can be improved by about 3 dB as compared to the RZ format.

In the above described upgrade method, when it is considered to apply the RZ-DPSK format to an increased optical channel, since the RZ-DPSK optical signal has smaller spectral line broadening, an advantage is expected where optical signals can be arranged in higher density than in the RZ format. Moreover, even when cumulative dispersion in the transmission path is large and, in the RZ format, desired transmission quality cannot be ensured due to a large penalty, RZ-DPSK optical signals can be increased, because of the excellent reception sensitivity in the RZ-DPSK format.

However, in the above described conventional upgrade method, when application of the phase modulation method such as RZ-DPSK to the optical signal to be increased is assumed, if the modulation method of the existing optical signal to be adjacent to the optical signal to be increased in the wavelength range is not phase modulation but intensity modulation such as RZ, the transmission characteristic of the phase-modulated optical signal to be increased may deteriorate due to the interaction with the intensity-modulated optical signal. In other words, the phase-modulated optical signal carries information on the optical phase, but there is a possibility that information of the intensity-modulated optical signal may be carried on the phase of the phase-modulated optical signal as a noise due to the cross phase modulation (XPM) from the adjacent intensity-modulated optical signal. If such a phenomenon occurs, the transmission characteristic of the phase-modulated optical signal deteriorates, which causes a problem.

The above problem will be specifically described with reference to FIGS. 13 to 15. First as shown in FIG. 13, a phase variation (thick line) caused in the adjacent channel by the RZ optical signal is different between data "1" corresponding to a high level of the optical waveform (thin line) and data "0" corresponding to a low level thereof. On the other hand, as shown in FIG. 14, the phase variation caused in the adjacent channel by the RZ-DPSK optical signal is constant irrespective of data "1" and "0". Therefore, as shown in FIG. 15, the RZ-DPSK optical signal causes signal deterioration due to disturbance, that is, phase modulation due to an influence of a phase change affected by the adjacent RZ optical signal. Such deterioration of the RZ-DPSK optical signal is hardly suppressed even if the conventional technique such as optimization of wavelength arrangement is applied, taking into consideration the aforementioned bit pattern of the adjacent optical signal.

SUMMARY OF THE INVENTION

In view of the above situation, it is an object of the present invention to provide a WDM optical transmission system and a WDM optical transmission method, which can reduce an influence of phase modulation on a phase-modulated optical signal received from an adjacent intensity-modulated optical signal in the wavelength range, and can realize excellent transmission characteristics.

In order to achieve the above object, the WDM optical transmission system of the present invention is a system in which a WDM signal light including at least one intensity-modulated optical signal and at least one phase-modulated optical signal is transferred via an optical transmission path. The WDM optical transmission system comprises: an optical waveform detecting section which detects an optical waveform of the intensity-modulated optical signal adjacent to the phase-modulated optical signal in a wavelength range; a signal processing section which determines a state of phase modulation of the phase-modulated optical signal affected by the adjacent intensity-modulated optical signal in the optical transmission path, based on the optical waveform detected by the optical waveform detecting section, and calculates a phase modulation drive waveform capable of canceling the phase modulation; and a phase modulating section which additionally phase-modulates the phase-modulated optical signal synchronously with the adjacent intensity-modulated optical signal, according to the drive waveform calculated by the signal processing section.

Furthermore the WDM optical transmission method of the present invention is a method for transferring a WDM signal light including at least one intensity-modulated optical signal and at least one phase-modulated optical signal via an optical transmission path. The WDM optical transmission method comprises: detecting an optical waveform of an intensity-modulated optical signal adjacent to a phase-modulated optical signal in a wavelength range; determining a state of phase modulation of the phase-modulated optical signal affected by the adjacent intensity-modulated optical signal in the optical transmission path, based on the detected optical waveform; calculating a phase modulation drive waveform capable of canceling the determined phase modulation; and additionally phase-modulating the phase-modulated optical signal synchronously with the adjacent intensity-modulated optical signal, according to the calculated drive waveform.

In the above WDM optical transmission system and the WDM optical transmission method, the optical waveform of the intensity-modulated optical signal adjacent to the phase-modulated optical signal in the wavelength range is detected, and phase modulation (XPM) of the phase-modulated optical signal affected by the adjacent intensity-modulated optical signal in the optical transmission path is determined based on the detection result, to calculate the phase modulation drive waveform capable of canceling the phase modulation. Then by additionally applying the phase modulation according to the drive waveform to the phase-modulated optical signal synchronously with the adjacent intensity-modulated optical signal, the XPM generated in the optical transmission path is compensated.

According to the above WDM optical transmission system and the WDM optical transmission method of the present invention, since the influence of phase modulation on the phase-modulated optical signal received from the adjacent intensity-modulated optical signal in the wavelength range can be reduced, excellent transmission characteristic can be realized.

Other objects, features and advantages of the present invention will become apparent from the following description of the embodiments, in conjunction with the appended drawings.

DESCRIPTION OF THE PREFERRED EMBODIMENTS

Hereunder is a description of a best mode for carrying out the present invention with reference to the appended drawings. Throughout the drawings, the same reference symbols denote the same or equivalent components.

Figure 1:
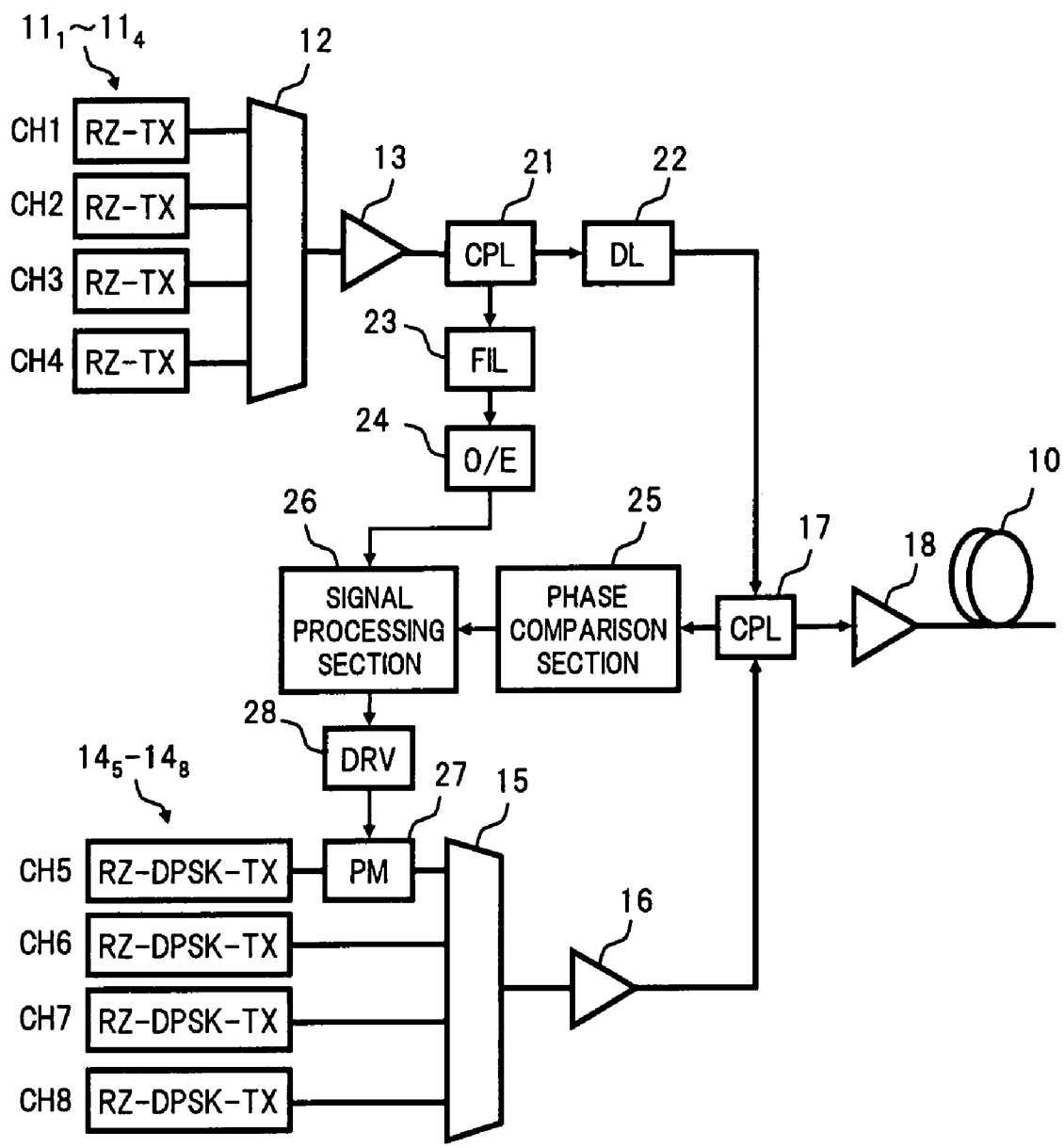
FIG. 1 is a diagram showing a configuration of the main part of a WDM optical transmission system according to a first embodiment of the present invention.

FIG. 1 is a diagram showing a configuration of the main part of a WDM optical transmission system according to a first embodiment of the present invention.

In FIG. 1, the WDM optical transmission system in the first embodiment comprises, as a configuration for transmitting an existing optical signal to an optical transmission path in the aforementioned upgrade method for increasing the transmission capacity, for example, RZ optical transmitters $11_1$, $11_2$, $11_3$, and $11_4$ which transmit RZ optical signals (optical channels) CH1, CH2, CH3, and CH4 having different wavelengths, a multiplexer 12 which combines the optical signals CH1 to CH4 output from the respective optical transmitters $11_1$ to $11_4$, and an optical amplifier 13 which amplifies the output light from the multiplexer 12 to a required level and transmits the amplified output light to an optical transmission path 10.

Moreover as a configuration for increasing phase-modulated optical signals with respect to the RZ optical signals CH1 to CH4, the WDM optical transmission system also comprises, for example, RZ-DPSK optical transmitters $14_5$, $14_6$, $14_7$, and $14_8$ which transmit RZ-DPSK optical signals CH5, CH6, CH7, and CH8 having different wavelengths, a multiplexer 15 which combines the optical signals CH5 to CH8 output from the respective RZ-DPSK optical transmitters $14_5$, $14_6$, $14_7$, and $14_8$, an optical amplifier 16 which amplifies the output light from the multiplexer 15 to a required level, an optical coupler (CPL) 17 which once combines the RZ optical signals CH1 to CH4 transmitted from the optical amplifier 13 to the optical transmission path 10, and the RZ-DPSK optical signals CH5 to CH8 output from the optical amplifier 16, then branches the coupled optical signals into two and respectively outputs those optical signals, and an optical amplifier 18 which amplifies one of the branched lights output from the optical coupler 17 (WDM signal light including optical signals CH1 to CH8) to a required level and transmits the light to the optical transmission path 10.

Furthermore as a configuration for reducing the influence of phase modulation on the RZ-DPSK optical signal received from the adjacent RZ optical signal, the WDM optical transmission system further comprises, an optical coupler (CPL) 21 which branches the RZ optical signals CH1 to CH4 output from the optical amplifier 13 into two at a preset branching ratio, an optical delay element (DL) 22 inserted on the optical path between one output port of the optical coupler 21 and an input port of the optical coupler 17, an optical filter (FIL) 23 which extracts the optical signal CH4 having a wavelength adjacent to the RZ-DPSK optical signal CH5, from the optical signals CH1 to CH4 output from the other output port of the optical coupler 21, a photoelectric transducer (O/E) 24 which converts the optical signal CH4 extracted by the optical filter 23 to an electric signal, a phase comparison section 25 which detects a synchronization state between the RZ optical signal CH4 and the RZ-DPSK optical signal CH5 by using the other of the branched lights output from the optical coupler 17, a signal processing section 26 which calculates a phase modulation drive waveform for canceling the cross phase modulation (XPM) occurring in the optical transmission path 10, based on the electric signals respectively output from the photoelectric transducer 24 and the phase comparison section 25, a phase modulator 27 inserted on the optical path between the RZ-DPSK optical transmitter $14_5$ corresponding to the optical signal CH5 and the multiplexer 15, and a driver circuit (DRV) 28 which drives the phase modulator 27 according to the drive waveform calculated by the signal processing section 26.

Figure 2:
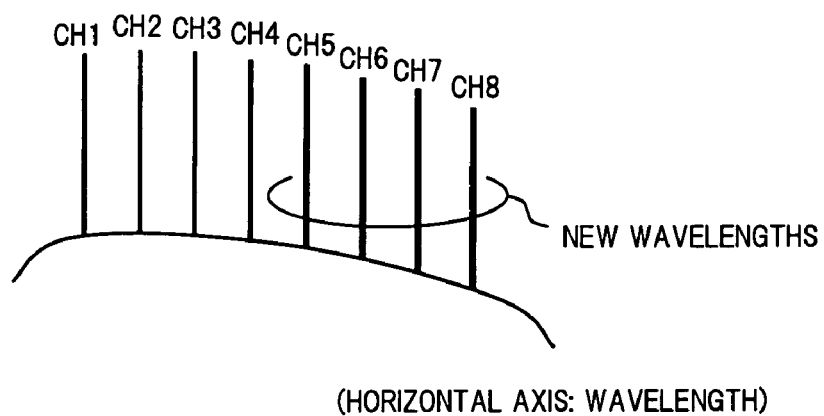
FIG. 2 is a diagram showing one example of wavelength arrangement of WDM signal light in the first embodiment.

In the WDM optical transmission system of such a configuration, the wavelength arrangement of the WDM signal light transmitted to the optical transmission path 10 is such that, as shown for example in FIG. 2, the optical channels CH1 to CH4 are existing RZ optical signals, and RZ-DPSK optical channels CH5 to CH8 to be increased are arranged on the long wavelength side thereof. In such a wavelength arrangement of the WDM signal light, the RZ optical channel CH4 and the RZ-DPSK optical channel CH5 are adjacent to each other in the wavelength range.

Figure 12:
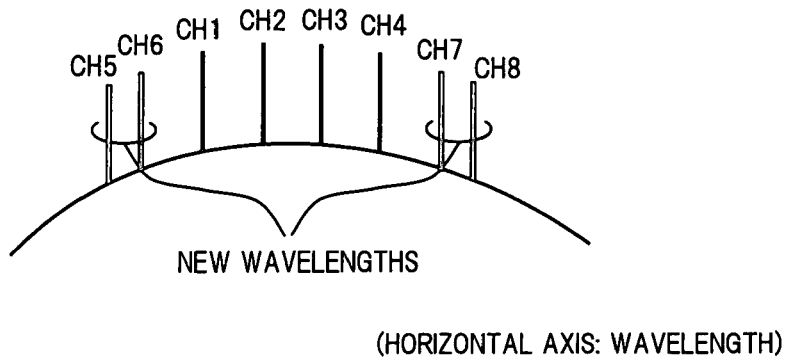
FIG. 12 is a diagram showing one example of wavelength arrangement of WDM signal light in the first conventional upgrade method.

The wavelength arrangement of the existing optical signals and the optical signals to be increased in the present invention is not limited to the example above, and for example, the optical channels to be increased may be arranged on the short wavelength side and the long wavelength side of the existing optical channels as shown in FIG. 12. In the case of the wavelength arrangement in FIG. 12, the existing optical signal CH1 and the optical signal CH6 to be increased, and the existing optical signal CH4 and the optical signal CH7 to be increased are adjacent to each other in the wavelength range. Moreover in the above wavelength arrangement of the WDM signal light, upgrade of the marine optical cable system and the like is assumed basically, and an optical signal to be increased is arranged outside a wavelength band of the existing optical signals. However, application of the present invention is also effective when add/drop and cross-connect of the optical signals are performed on a network such as an overland optical metro network, so that phase-modulated optical signals and the intensity-modulated optical signals are arranged adjacent to each other.

Next the operation of the WDM optical transmission system shown in FIG. 1, particularly, a method for reducing the influence of the phase modulation (XPM) on the RZ-DPSK optical signal CH5, received from the RZ optical signal CH4 will be described in detail.

In the WDM optical transmission system, phase modulation for canceling the XPM generated in the optical transmission path 10 is additionally applied to the RZ-DPSK optical signal CH5, in order to compensate the influence of the phase modulation on the RZ-DPSK optical signal CH5 received from the adjacent RZ optical signal CH4. In order to realize the phase modulation for canceling the XPM, it is necessary to know the data of the RZ optical signal CH4 transmitted to the optical transmission path 10.

For this purpose, here a part of the WDM signal light obtained by combining the optical signals CH1 to CH4 and output from the optical amplifier 13, is branched by the optical coupler 21, and the branched light is given to the optical filter 23. The optical filter 23 has a transparent band corresponding to the wavelength of the optical signal CH4, and the optical signal CH4 is extracted from the WDM signal light branched by the optical coupler 21. Then the optical signal CH4 extracted by the optical filter 23 is converted to an electric signal by the photoelectric transducer 24, and the electric signal is transmitted to the signal processing section 26.

In the signal processing section 26, the phase modulation drive waveform for canceling the XPM in the optical transmission path 10 is calculated based on the electric signal from the photoelectric transducer 24. This calculation is performed, taking chromatic dispersion of the optical transmission path 10 into consideration, and specifically, is executed by using information relating to (A) to (C) below.

(A) Size of XPM causing phase modulation in the optical signal CH5;

(B) Waveform of optical signal affecting the optical signal CH5;

(C) Chromatic dispersion and loss characteristic of the optical transmission path 10.

The information (A) can be obtained by calculating a product of a nonlinear constant $\gamma$ of the optical transmission path 10 and a power p of the optical signal CH4 indicated by the electric signal from the photoelectric transducer 24 ($\gamma \times p$). The information (B) can be obtained from an RZ waveform of the adjacent optical signal CH4, that is, a waveform of the electric signal from the photoelectric transducer 24. Moreover, the information (C) can be obtained by referring to characteristic data of the optical transmission path 10 or the like. An amount of occurrence of the XPM occurring at a certain point on the optical transmission path 10 can be calculated based on the information (A) and (B), and by using the calculation result and the information (C), the waveform of the phase modulation occurring in the optical signal CH5 due to an influence of the adjacent optical signal CH4 can be obtained. Then the phase modulation drive waveform additionally applied to the optical signal CH5 for canceling the XPM received from the RZ optical signal CH4 can be calculated by reversing the polarity of the phase modulation waveform.

Here in order to obtain the waveform information of the optical signal CH4, the optical signal CH4 is extracted from the WDM signal light by using the optical coupler 21 and the optical filter 23 to convert the optical signal CH4 to an electric signal by the photoelectric transducer 24. However, if the electric signal to be given to the RZ optical transmitter 11$_4$, which generates the optical signal CH4, as a data signal can be separately extracted, the data signal may be given to the signal processing section 26 instead of the electric signal from the photoelectric transducer 24.

Figure 13:
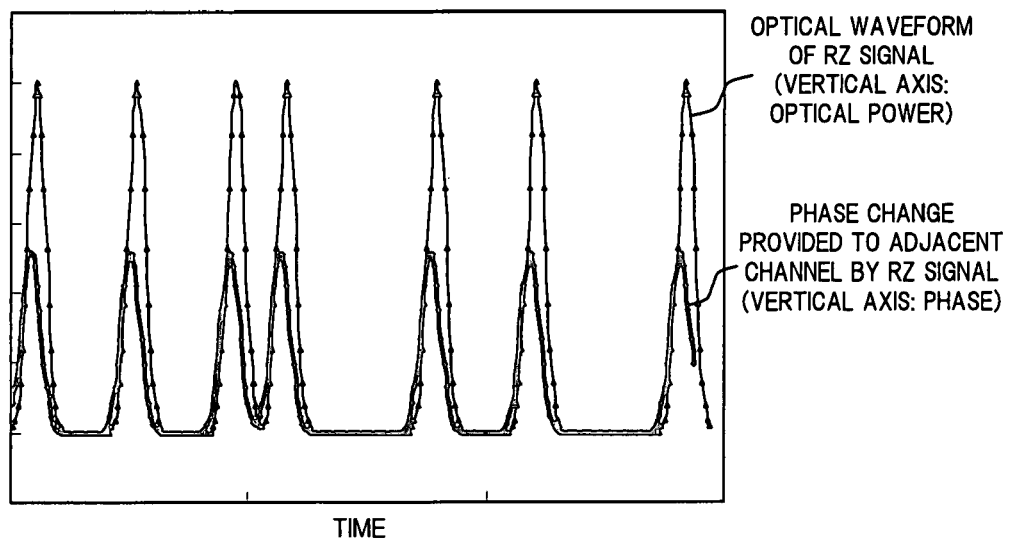
FIG. 13 is a diagram showing one example of phase change provided to an adjacent channel by the RZ signal.
Figure 14:
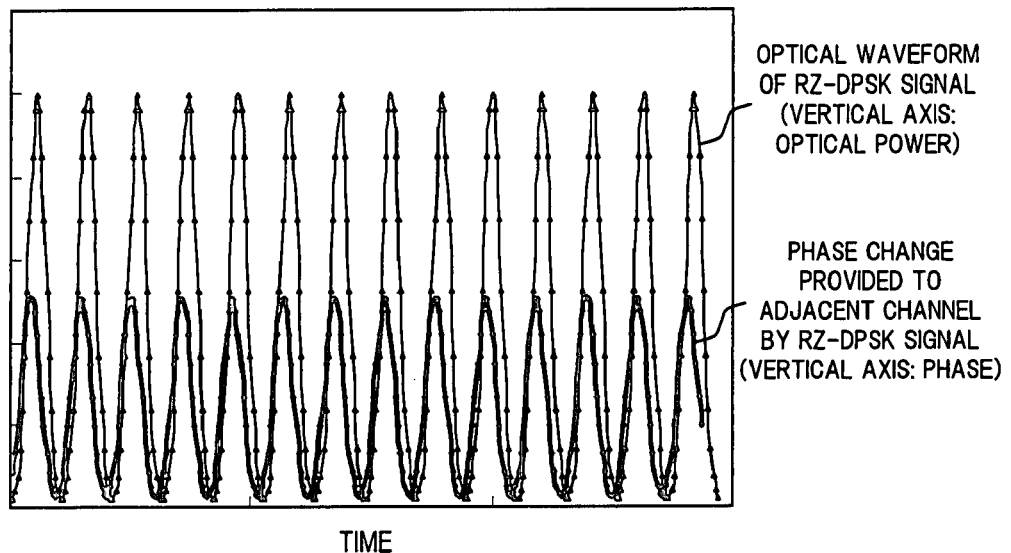
FIG. 14 is a diagram showing one example of phase change given to an adjacent channel by the RZ-DPSK signal.
Figure 15:
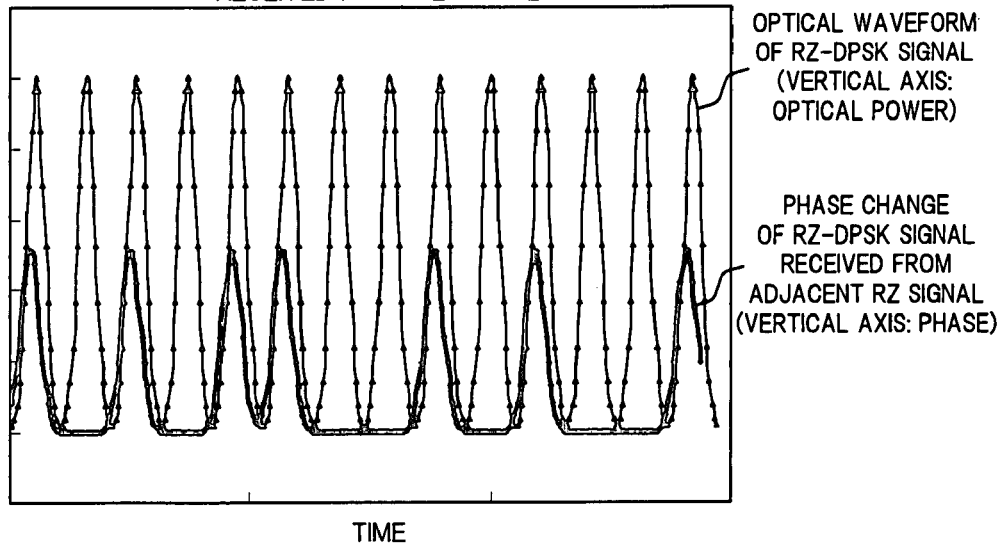
FIG. 15 is a diagram showing one example of phase change given to the RZ-DPSK signal by the adjacent RZ signal.

Moreover the wavelength of the phase modulation occurring in the optical signal CH5 due to the influence of the adjacent optical signal CH4 obtained by the aforementioned signal processing section 26, corresponds to the waveform shown by thick line in FIG. 15, and has substantially the same shape as that of an optical pulse waveform of the RZ signal shown by thin line in FIG. 13. Therefore, even when the drive signal of the RZ optical transmitter 11$_4$, which generates the optical signal CH4, is extracted and the drive waveform thereof is used as the drive waveform of the phase modulation to be additionally applied to the optical signal CH5, the effect of reducing the XPM received from the optical signal CH 4 can be obtained sufficiently. By applying the above configuration, the phase modulation drive waveform can be determined by a simple configuration.

When in the above manner, the phase modulation drive waveform relative to the optical signal CH5 is calculated by the signal processing section 26, a drive control signal indicating the drive waveform is transmitted to the driver circuit 28, and the phase modulator 27 provided on the subsequent stage of the RZ-DPSK optical transmitter 14$_5$ is driven according to the drive waveform. As a result, phase modulation for canceling the XPM received from the optical signal CH4 is additionally applied to the optical signal CH5 output from the RZ-DPSK optical transmitter 14$_5$.

The phase modulation relative to the optical signal CH5 needs to be synchronized timewise with the data of the RZ optical signal CH4. Therefore in this embodiment, the optical delay element 22 is provided on the subsequent stage of the optical coupler 21, so that the time at which RZ optical signals CH1 to CH4 are transmitted to the optical transmission path 10 is delayed corresponding to the time required for calculation by the signal processing section 26. The optical delay element 22 can be realized by using, for example, a fiber delay line. Moreover, the phase comparison section 25 detects whether the timing of the phase modulation applied to the RZ-DPSK optical signal CH5 synchronizes with the data timing of the RZ optical signal CH4, and the result thereof is fed back to the signal processing section 26.

Figure 3:
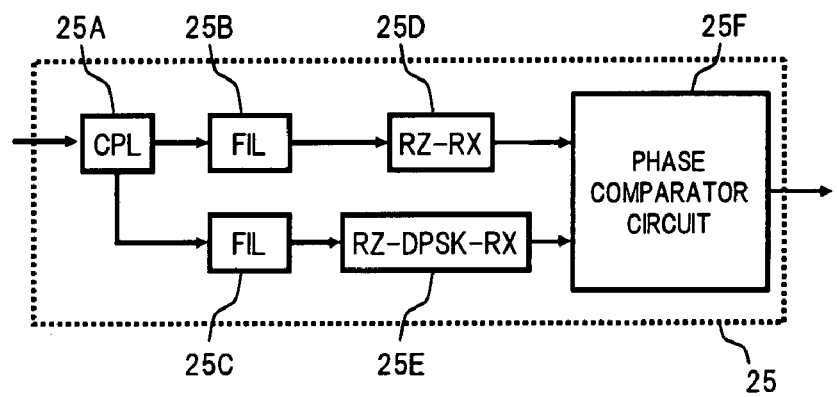
FIG. 3 is a diagram showing a specific configuration example of a phase comparison section in the first embodiment.

FIG. 3 is a diagram showing an example of a specific configuration of the phase comparison section 25. In this configuration example, WDM signal light output from the optical coupler 17 shown in FIG. 1 is input to an optical coupler (CPL) 25A and branched into two, one of the branched lights being sent to an optical filter (FIL) 25B and the other being sent to an optical filter (FIL) 25C. The optical filter 25B extracts the optical signal CH4 from the branched light from the optical coupler 25A, and the optical signal CH4 is received by an RZ optical receiver (RZ-RX) 25D. Moreover the optical filter 25C extracts the optical signal CH5 from the branched light from the optical coupler 25A, and the optical signal CH5 is received by an RZ-DPSK optical receiver (RZ-DPSK-RX) 25E. Then the received signals respectively output from the RZ optical receiver 25D and the RZ-DPSK optical receiver 25E are provided to a phase comparator circuit 25F. By comparing the phase of respective signals, it is monitored whether the timing of phase modulation additionally applied to the optical signal CH5 is synchronized with the phase (data timing) of the optical signal CH4, and the monitor result is fed back to the signal processing section 26 shown in FIG. 1.

In order to realize phase comparison in the phase comparator circuit 25F, for example, all the data of the RZ-DPSK optical signal CH5 needs to be set to "1" during a predetermined period, and an amplitude of the phase modulation for canceling the XPM is set to $\pi$, to perform phase comparison.

Figure 4:
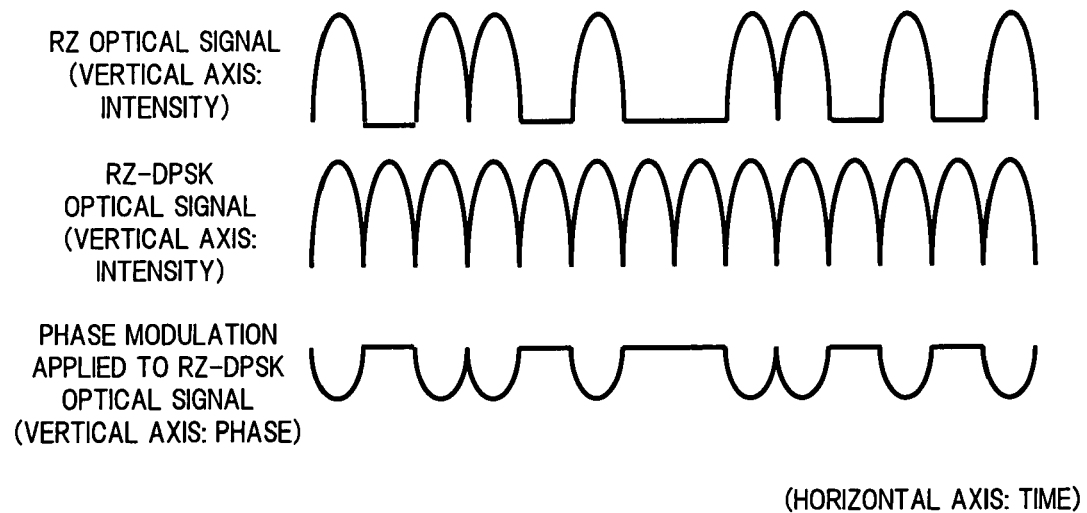
FIG. 4 is a diagram for explaining an RZ signal, an RZ-DPSK signal, and phase relation of phase modulation applied to the RZ-DPSK signal.

The signal processing section 26 fed back with the monitor result of the phase comparator circuit 25F performs timing adjustment of the drive control signal to be output to the driver circuit 28 so that the phase modulation timing applied to the optical signal CH5 is synchronized with the data timing of the optical signal CH4. As a result, the RZ optical signal CH4 and the RZ-DPSK optical signal CH5 transmitted from the optical coupler 17 to the optical transmission path 10, and phase modulation additionally applied to the optical signal CH5 have a phase relation, for example, as shown in FIG. 4, and phase modulation (lower stage) with the timing being synchronized but the polarity being reversed is applied to the optical signal CH5, relative to the pulse waveform (upper stage) of the optical signal CH4. In the example shown in FIG. 4, the pulse waveform (upper stage) of the optical signal CH4 and the pulse waveform (middle stage) of the optical signal CH5 are also synchronized with each other. However, if the pulse waveform of the optical signal CH4 and the phase modulation additionally applied to the optical signal CH5 are synchronized with each other, a deviation in timing occurring between pulse waveforms of the respective optical signals CH4 and CH5 does not cause any problem.

In the above manner, according to the WDM optical transmission system in the first embodiment, since phase modulation for canceling the XPM received from the adjacent RZ optical signal CH4 is additionally applied to the RZ-DPSK optical signal CH5, excellent transmission characteristic can be realized even when upgrade is performed by applying the RZ-DPSK format to the modulation method of the optical signal to be increased.

In the first embodiment, an example is shown in which an optical delay element having a fixed delay amount is used as the optical delay element 22. However, the phase (delay) between the optical signal CH4 and the optical signal CH5 can be adjusted by using an optical delay element having a variable delay amount. As the optical delay element having the variable delay amount, for example, one which changes the delay amount by heating a quartz waveguide by a heater or the like can be used. By applying such a configuration, the data timing of the RZ optical signal CH4, and the timing of phase modulation applied to the RZ-DPSK optical signal CH5 can be more reliably synchronized.

Figure 5:
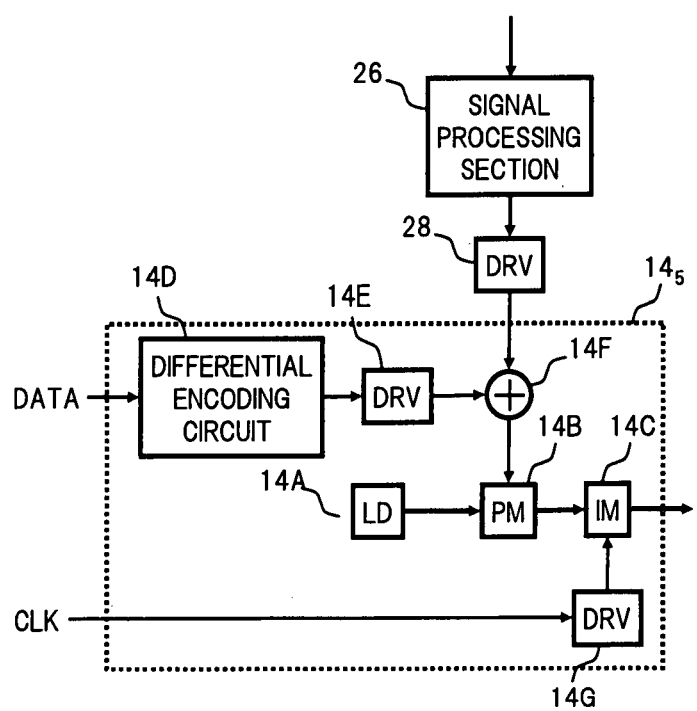
FIG. 5 is a diagram showing a modified example related to the first embodiment, in which phase modulation for canceling XPM is performed by using a phase modulator in an RZ-DPSK optical transmitter.

Moreover, a configuration example is shown in which the phase modulator 27 is provided on the subsequent stage of the RZ-DPSK optical transmitter $14_5$ to apply phase modulation for canceling the XPM received from the adjacent RZ optical signal CH4 to the optical signal CH5. However, for example as shown in FIG. 5, phase modulation for canceling the XPM can be also performed by using a phase modulator 14B in the RZ-DPSK optical transmitter $14_5$. Specifically, in the configuration example in FIG. 5, the phase modulator (PM) 14B and an intensity modulator (IM) 14C are cascade-connected on the subsequent stage of a light source (LD) 14A which outputs continuous light. A DPSK modulation signal generated by a differential encoding circuit 14D according to a data signal DATA is provided to a driver circuit 14E, and a drive signal output from the driver circuit (DRV) 14E and a drive signal output from the driver circuit 28 according to the drive waveform calculated by the aforementioned signal processing section 26, are provided to an adder 14F, to thereby drive the phase modulator 14B according to the added drive signal. As a result, the continuous light from the light source 14A is DPSK-modulated according to the data signal DATA, and simultaneously, phase modulation for canceling the XPM is additionally applied. Then the optical signal phase-modulated by the phase modulator 14B is intensity-modulated according to a clock signal CLK by the intensity modulator 14C, thereby enabling RZ pulsing. As a result, the RZ-DPSK optical signal CH5 additionally applied with phase modulation for canceling the XPM received from the adjacent RZ optical signal CH4 is directly output from the RZ-DPSK optical transmitter $14_5$.

Next is a description of a second embodiment of the present invention.

Figure 6:
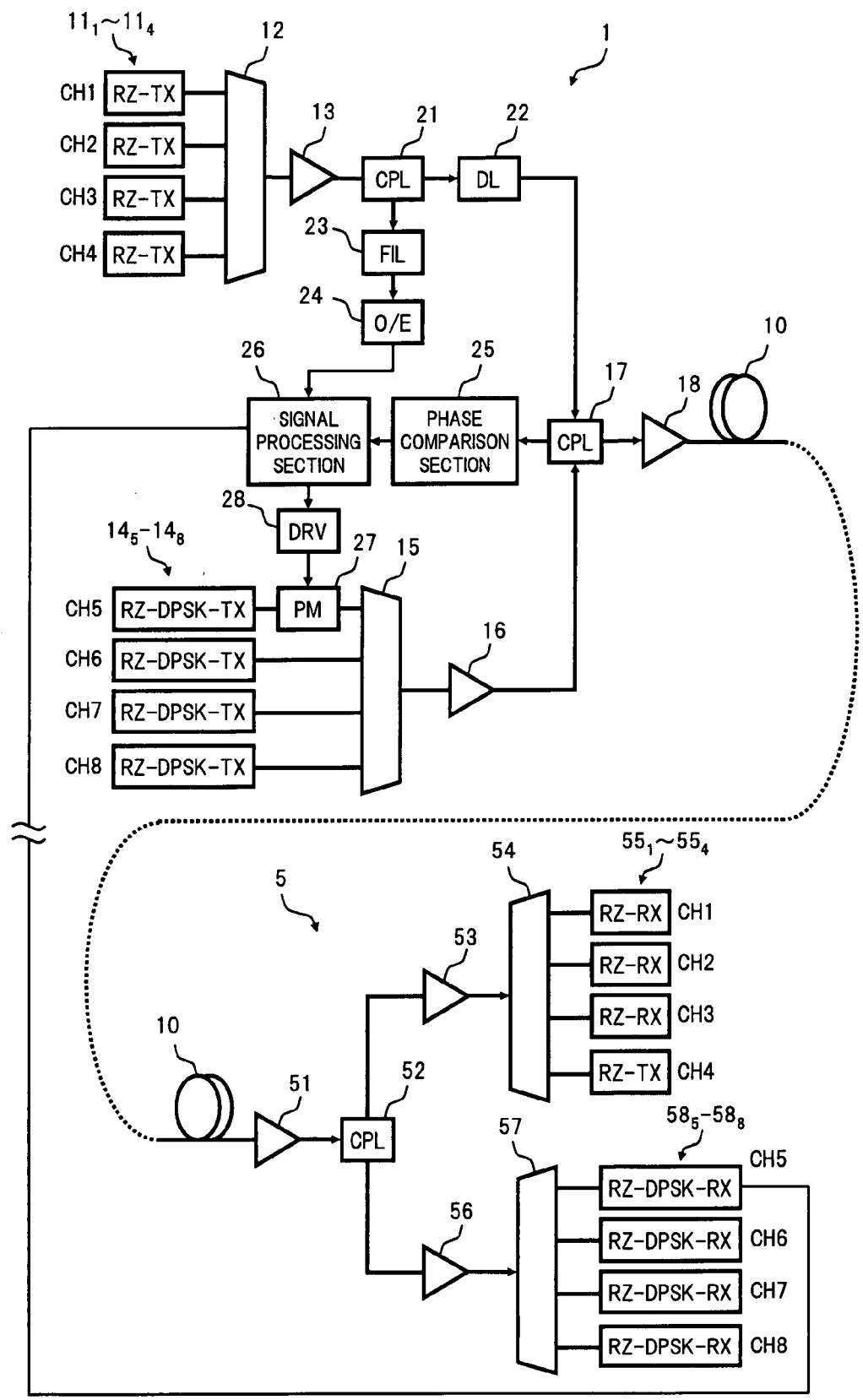
FIG. 6 is a diagram showing a configuration of the main part of the WDM optical transmission system according to a second embodiment of the present invention.

FIG. 6 is a diagram showing a configuration of the main part of the WDM optical transmission system according to the second embodiment of the present invention.

In FIG. 6, in the WDM optical transmission system according to this embodiment, the WDM signal light transmitted from an optical transmission terminal 1 to the optical transmission path 10 is received by an optical reception terminal 5, in the configuration of the first embodiment described above, error rate information relating to the RZ-DPSK optical signal CH5 detected by the optical reception terminal 5 is transmitted to the signal processing section 26 in the optical transmission terminal 1, and an average degree of phase modulation (drive amplitude of the phase modulator 27) to be additionally applied to the RZ-DPSK optical signal CH5 is adjusted based on the error rate information. The configuration of the optical transmission terminal 1 is basically the same as for the case of the first embodiment.

In the optical reception terminal 5, the WDM signal light transmitted on the optical transmission path 10 is amplified to a required level by an optical amplifier 51, and then branched into two by an optical coupler (CPL) 52. One of the branched lights output from the optical coupler 52 is amplified to a required level by an optical amplifier 53, and then respectively branched to RZ optical signals CH1 to CH4 by a branching filter 54 using an arrayed waveguide grating (AWG) or the like, and received by RZ optical receivers (RZ-RX) $55_1$ to $55_4$ corresponding to the respective optical signals CH1 to CH4. Moreover the other branched light output from the output coupler 52 is amplified to a required level by an optical amplifier 56, and then respectively branched to RZ-DPSK optical signals CH5 to CH8 by a branching filter 57 using the AWG or the like, and received by RZ-DPSK optical receivers (RZ-DPSK-RX) $55_5$ to $55_8$ corresponding to the respective optical signals CH5 to CH8. Then the error rate information detected by the RZ-DPSK optical receiver $55_5$ corresponding to the optical signal CH5 is transmitted to the signal processing section 26 in the optical transmission terminal 1, by using a monitored control light or the like transmitted on, for example, an opposing line (not shown). The means for transmitting the error rate information of the optical signal CH5 to the transmission side is not limited to the example shown above.

In the WDM optical transmission system having the above configuration, the size of the XPM occurring on the optical transmission path 10 changes according to relative polarization states of two optical signals having adjacent wavelengths. Specifically, when the polarization states of the two optical signals are the same, the XPM becomes the largest, and when the polarization states of the two optical signals are orthogonal to each other, the XPM becomes the smallest. Since the polarization states of the optical signals in the optical transmission path 10 fluctuate timewise, the magnitude of the XPM occurring in the optical transmission path 10 also fluctuates timewise, and the influence of the XPM fluctuation appears in the error rate detected at the receiving end. Therefore, if there is a deviation between the magnitude of the XPM actually occurring in the optical transmission path 10 and the intensity (the average degree) of phase modulation additionally applied to the optical signal CH5 on the transmission side for canceling the XPM, the error rate of the optical signal CH5 detected on the reception side increases.

Therefore in the second embodiment, the error rate information of the optical signal CH5 detected on the receiver side is fed back to the signal processing section 26 on the transmission side, and the amplitude of the drive waveform is adjusted so that the error rate on the reception side becomes as low as possible with respect to the phase modulation drive waveform calculated in the signal processing section 26. This amplitude adjustment needs to be performed in such a manner that a change direction of the drive amplitude in which the error rate decreases is determined by slightly changing the drive amplitude by dithering or the like, to thereby optimize the drive amplitude. As a result, even when the magnitude of the XPM occurring on the optical transmission path 10 fluctuates timewise, phase modulation for canceling the XPM can be applied to the optical signal CH5, following to the fluctuation.

As described above, according to the WDM optical transmission system in the second embodiment, the error rate information detected on the receiver side is fed back to the transmission side, so as to adjust the average degree of phase modulation (the amplitude of the drive signal) additionally applied to the RZ-DPSK optical signal CH5. As a result, the XPM occurring on the optical transmission path 10 can be compensated with higher accuracy, thereby enabling realization of more excellent transmission characteristic.

Next is a description of a third embodiment of the present invention.

Figure 7:
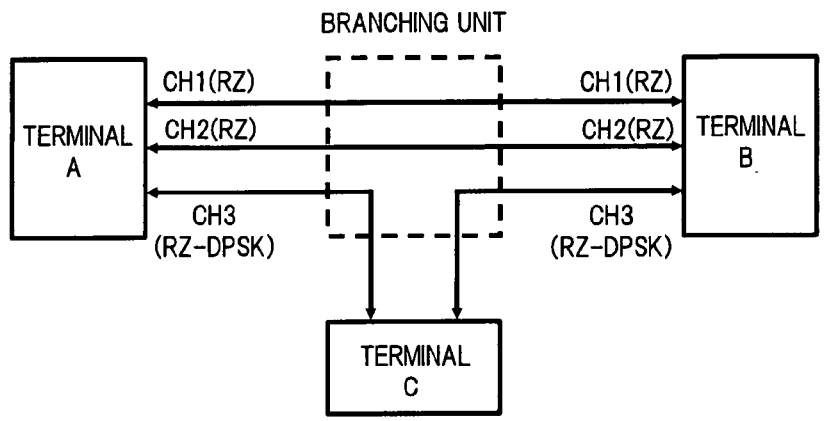
FIG. 7 is a diagram showing a configuration example of a network in which it is difficult to apply phase modulation to the RZ-DPSK signal on a transmission side.

In the first and the second embodiments, the transmission side monitors the adjacent RZ optical signal CH4, and additionally applies phase modulation for canceling the XPM occurring in the optical transmission path 10 to the RZ-DPSK optical signal CH5, based on the monitor result. However, when the RZ optical signals CH1 and CH2 and the RZ-DPSK optical signal CH3 are to be transferred between three terminals A to C away from each other in a network configuration, for example, as shown in FIG. 7, it is difficult for the terminal C to obtain information of the RZ optical signal required for phase-modulating the RZ-DPSK optical signal on the transmission side. In such a case, phase modulation relative to the RZ-DPSK optical signals needs to be performed on the reception side. Therefore, in the third embodiment, an application example corresponding to such a case will be described.

Figure 8:
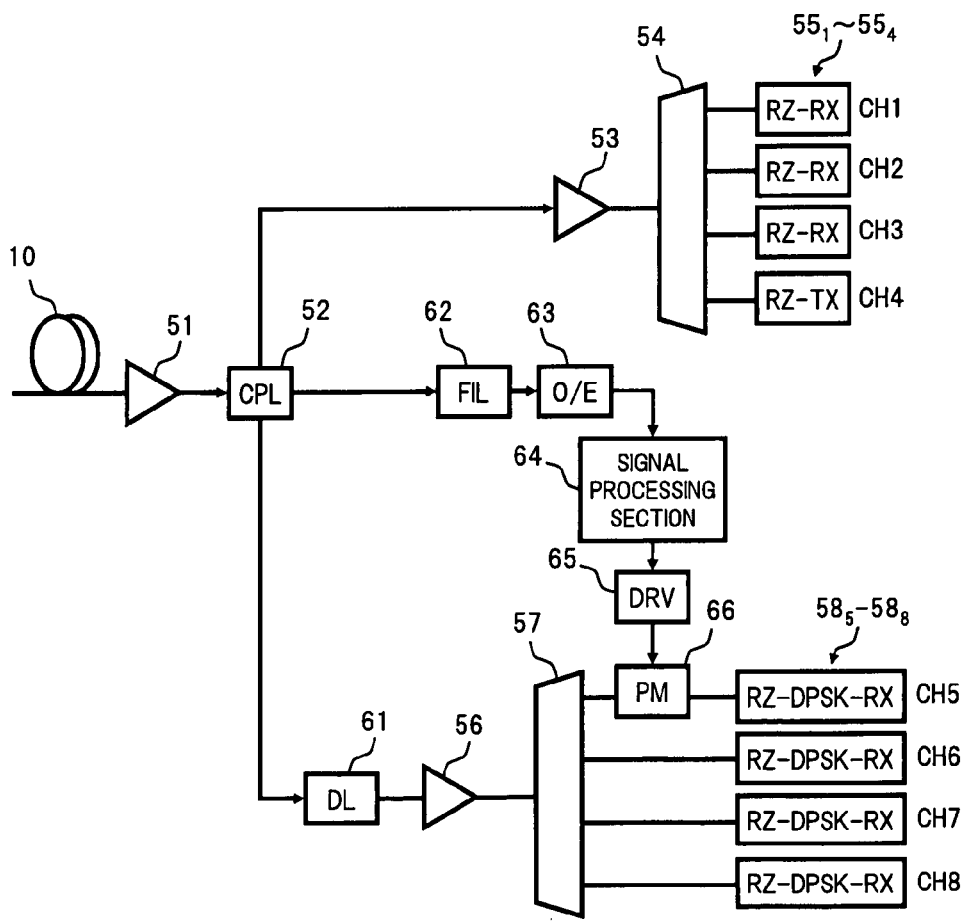
FIG. 8 is a diagram showing a configuration of the main part of the WDM optical transmission system according to a third embodiment of the present invention.

FIG. 8 is a diagram showing a configuration of the main part of the WDM optical transmission system according to the third embodiment of the present invention.

In the WDM optical transmission system shown in FIG. 8, the WDM signal light in which the wavelengths of the RZ optical signals CH1 to CH4 and the RZ-DPSK optical signals CH5 to CH8 are arranged in the same manner as in the case, for example shown in FIG. 2, is transmitted on the optical transmission path 10. After the WDM signal light is amplified to a required level by an optical amplifier 51 at the receiving end, the WDM signal light is branched to three herein by an optical coupler (CPL) 52. The branched light output from a first port of the optical coupler 52 is amplified to a required level by an optical amplifier 53, and then respectively branched to RZ optical signals CH1 to CH4 by a branching filter 54 using the AWG or the like, and received by Rz optical receivers (RZ-RX) $55_1$ to $55_4$ corresponding to the respective optical signals CH1 to CH4.

Moreover, the branched light output from a second port of the optical coupler 52 passes through an optical delay element (DL) 61, is amplified to a required level by an optical amplifier 56, and is then respectively branched to RZ-DPSK optical signals CH5 to CH8 by the branching filter 57 using the AWG or the like. The optical signal CH5 is received by an RZ-DPSK optical receiver (RZ-DPSK-RX) $58_5$ via a phase modulator 66, and the other optical signals CH6 to CH8 are directly provided to the RZ-DPSK optical receivers $58_6$ to $58_8$ corresponding to these, and received.

Moreover the branched light output from a third port of the optical coupler 52 is provided to an optical filter (FIL) 62 having a transmission band corresponding to the wavelength of the optical signal CH4 so as to extract only the optical signal CH4, and the optical signal CH4 is converted to an electric signal by a photoelectric transducer (O/E) 63 and transmitted to a signal processing section 64. The signal processing section 64 calculates a phase modulation drive waveform for canceling the XPM received by the optical signal CH5 from the adjacent optical signal CH4, based on the electric signal from the photoelectric transducer 63. The calculation method of the drive waveform in the signal processing section 64 is the same as the aforementioned calculation method in the signal processing section 26 in the first embodiment, and hence, explanation thereof is omitted here. When the phase modulation drive waveform is calculated by the signal processing section 26, a drive control signal indicating the drive waveform is transmitted to a driver circuit (DRV) 65, and a phase modulator 66 provided on the previous stage of the RZ-DPSK optical receiver 585 is driven according to the drive waveform. As a result, phase modulation for canceling the XPM received from the adjacent optical signal CH4 is applied to the received RZ-DPSK optical signal CH5, and the optical signal CH5 with the influence of XPM compensated is provided to the RZ-DPSK optical receiver $58_5$.

Phase modulation relative to the RZ-DPSK optical signal CH5 needs to be synchronized timewise with the data of the RZ optical signal CH4 monitored by the photoelectric transducer 63. Therefore in this embodiment, an optical delay element 61 is provided on an optical path between the optical coupler 52 and the optical amplifier 56, so that the time at which the RZ-DPSK optical signal CH5 is input to the phase modulator 66 is delayed corresponding to the time required for the calculation by the signal processing section 64.

In the above manner, according to the WDM optical transmission system in the third embodiment, even when it is difficult to obtain information related to the RZ optical signal CH4 adjacent to the RZ-DPSK optical signal CH5 on the transmission side, the optical signal CH4 is monitored on the reception side to apply phase modulation for canceling the XPM occurring in the optical transmission path 10 to the optical signal CH5. As a result, basically the same effect as for the case of the first embodiment can be obtained.

In the first to the third embodiments, additional phase modulation is applied to the RZ-DPSK optical signal CH5, taking into consideration the influence of the XPM received only from the one optical signal CH4 adjacent to the RZ-DPSK optical signal CH5 to be increased in the wavelength range, of the existing optical signals CH1 to CH4. However, the present invention is not limited thereto, and phase modulation relative to the RZ-DPSK optical signal CH5 can be performed, taking into consideration the influence of the XPM received from two or more RZ optical signals.

Figure 9:
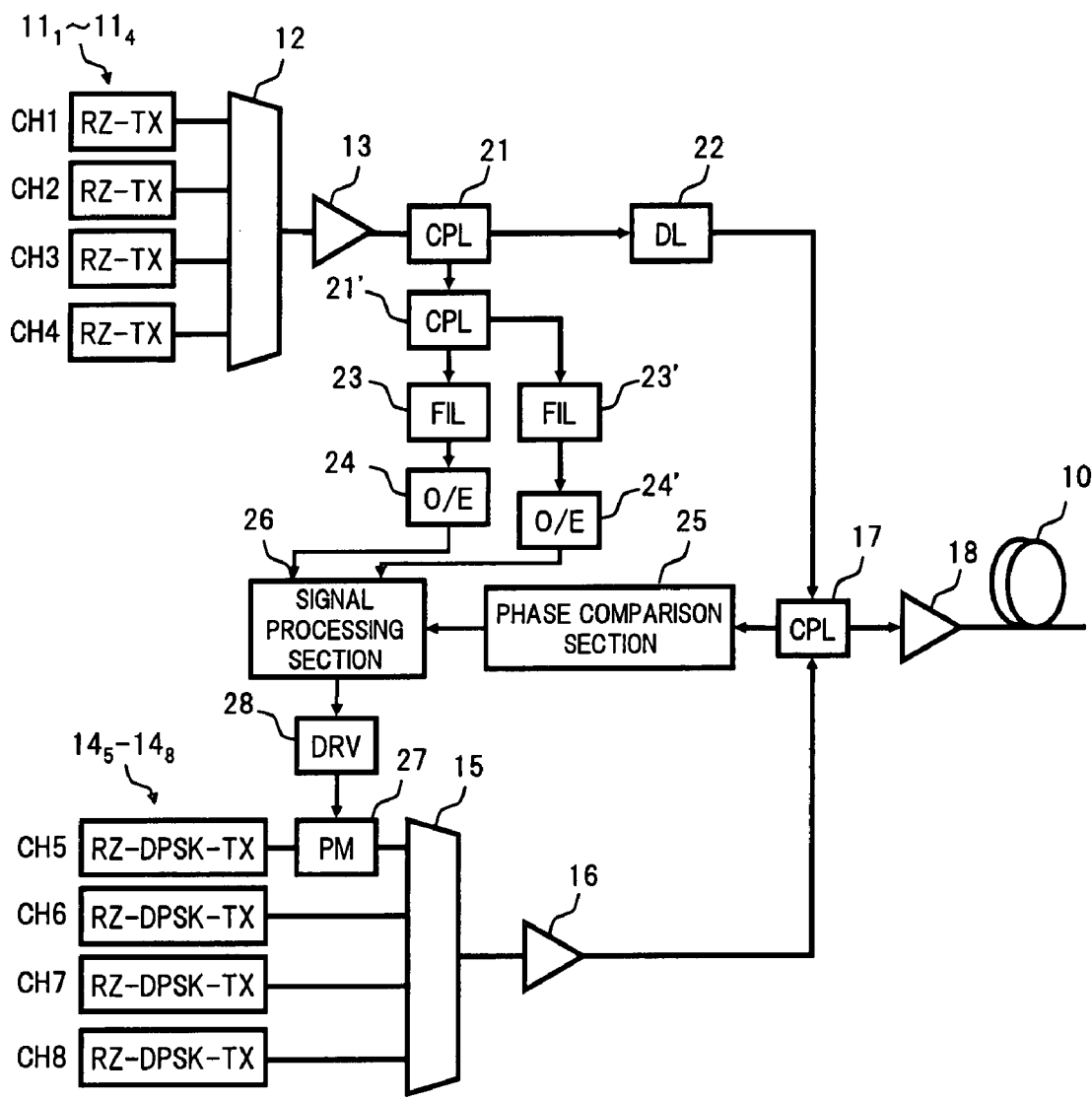
FIG. 9 is a block diagram showing a configuration of an application example in which phase modulation for canceling XPM received from a plurality of RZ signals is applied to the RZ-DPSK signal.
Figure 10:
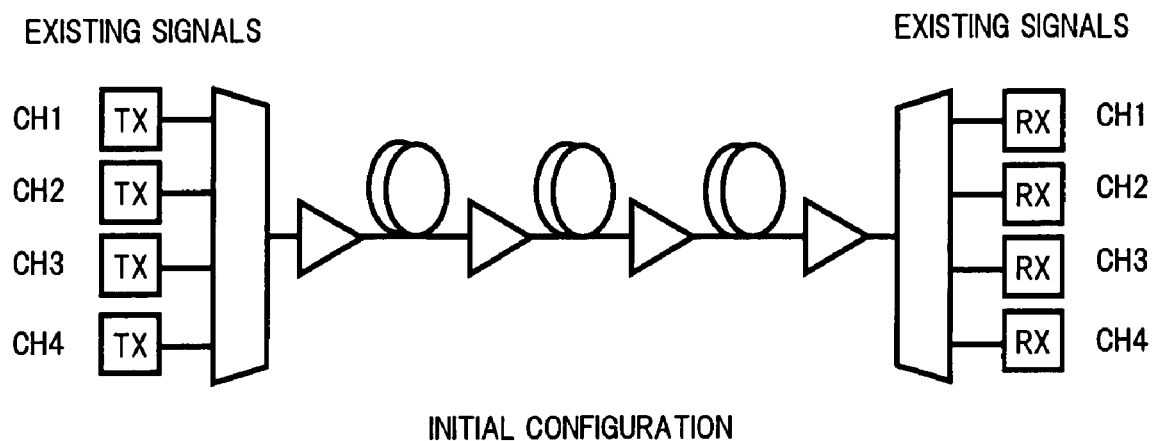
FIG. 10 is a diagram showing an initial configuration example of the WDM optical transmission system in a conventional upgrade method.
Figure 11:
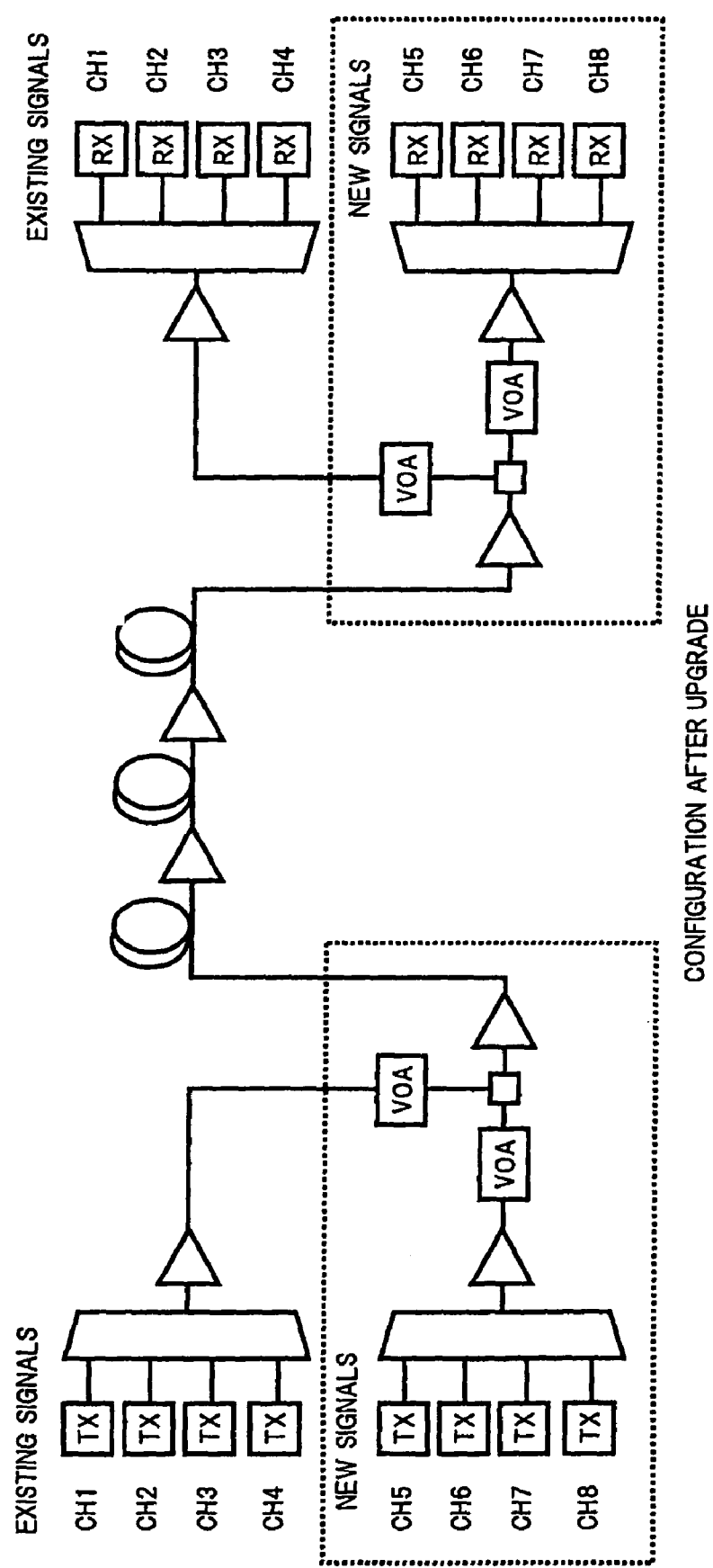
FIG. 11 is a diagram showing a configuration example of the WDM optical transmission system after being upgraded in the conventional upgrade method.

FIG. 9 shows a configuration example of a case in which the influence of XPM received from the RZ optical signal CH4 adjacent to the RZ-DPSK optical signal CH5, and the adjacent optical signal CH3 is taken into consideration. In this configuration example, the light branched by the optical coupler 21 is further branched into two by an optical coupler 21', the optical signal CH4 is extracted from one of the branched lights by the optical filter 23, and the optical signal CH3 is extracted from the other branched light by an optical filter 23'. Then the respective extracted optical signals CH4 and CH3 are converted to an electric signal by the photoelectric transducers 24 and the 24', and then transmitted to the signal processing section 26. The signal processing section 26 calculates, respectively, the phase modulation drive waveform for canceling the XPM received from the optical signals CH4 and CH3, and the phase modulator 27 is driven according to a signal obtained by adding the respective drive waveforms. As a result, additional phase modulation is applied to the RZ-DPSK optical signal CH5. According to such a configuration, the influence of XPM occurring on the optical transmission path 10 can be compensated with higher accuracy.

In the first to the third embodiments, an example in which the RZ format is employed as the intensity modulation method of existing optical signals, and the RZ-DPSK format is employed as the phase modulation method of optical signals to be increased has been described. However, the modulation method of the optical signals in the present invention is not limited to the above example. For example, the present invention is effective for optional combinations of, for example, optical signals in a known intensity modulation method such as NRZ with optical signals in a known phase (and frequency) modulation method such as a DPSK format, a carrier suppressed return to zero (CSRZ)-DPSK format, a differential quadrature phase shift keying (DQPSK) format, a RZ-DQPSK format, a CSRZ-DQPSK format, and a continuous phase-frequency shift keying (CP-FSK) format.

What is claimed is:

1. A WDM optical transmission system in which a WDM signal light including at least one intensity-modulated optical signal and at least one phase-modulated optical signal is transferred via an optical transmission path; said WDM optical transmission system comprising:
   an optical waveform detecting section which detects an optical waveform of the intensity-modulated optical signal adjacent to the phase-modulated optical signal in a wavelength range;
   a signal processing section which determines a state of phase modulation of said phase-modulated optical signal affected by said adjacent intensity-modulated optical signal in said optical transmission path, based on the optical waveform detected by said optical waveform detecting section, and calculates a phase modulation drive waveform capable of canceling the phase modulation; and
   a phase modulating section which additionally phase-modulates said phase-modulated optical signal synchronously with said adjacent intensity-modulated optical signal, according to the drive waveform calculated by said signal processing section.

2. A WDM optical transmission system according to claim 1, wherein
   said optical waveform detecting section detects said optical waveform in a stage prior to transmitting said adjacent intensity-modulated optical signal to said optical transmission path, and
   said phase modulating section additionally phase-modulates said phase-modulated optical signal synchronously with said adjacent intensity-modulated optical signal transmitted to said optical transmission path, according to a drive waveform calculated by said signal processing section, and transmits said optical signal to said optical transmission path.

3. A WDM optical transmission system according to claim 2, wherein there is provided a phase comparison section which compares the phase of said phase-modulated optical signal and said adjacent intensity-modulated optical signal, and detects whether the phase modulation additionally applied to said phase-modulated optical signal is synchronized with said adjacent intensity-modulated optical signal.

4. A WDM optical transmission system according to claim 2, wherein there is provided an optical delay element which delays said intensity-modulated optical signal transmitted to said optical transmission path, corresponding to the time required for processing in said optical waveform detecting section and said signal processing section.

5. A WDM optical transmission system according to claim 4, wherein said optical delay element is one having a variable delay amount.

6. A WDM optical transmission system according to claim 2, wherein
   said phase modulating section has a phase modulator connected to an output end of an optical transmitter which generates said phase-modulated optical signal, and said phase modulator additionally phase-modulates said phase-modulated optical signal by driving according to a drive waveform calculated by said signal processing section.

7. A WDM optical transmission system according to claim 2, wherein
   said phase modulating section uses a phase modulator provided inside an optical transmitter which generates said phase-modulated optical signal, to additionally phase-modulate said phase-modulated optical signal.

8. A WDM optical transmission system according to claim 2, wherein there is provided
   an error rate information transmitting section which acquires error rate information of said phase-modulated optical signal after being transmitted on said optical transmission path,
   and said signal processing section adjusts the amplitude of the calculated phase modulation drive waveform so that the error rate after transmission is a minimum.

9. A WDM optical transmission system according to claim 1, wherein
   said optical waveform detecting section detects the waveform of said adjacent intensity-modulated optical signal after being transmitted on said optical transmission path, and
   said phase modulating section phase-modulates said phase-modulated optical signal after being transmitted on said optical transmission path, synchronously with said adjacent intensity-modulated optical signal after being transmitted on said optical transmission path, according to a drive waveform calculated by said signal processing section.

10. A WDM optical transmission system according to claim 9, wherein there is provided an optical delay element which delays said phase-modulated optical signal after being transmitted on said optical transmission path, corresponding to the processing time in said optical waveform detecting section and said signal processing section.

11. A WDM optical transmission system according to claim 10, wherein said optical delay element is one having a variable delay amount.

12. A WDM optical transmission system according to claim 1, wherein
   said optical waveform detecting section respectively detects optical waveforms of a plurality of intensity-modulated optical signals adjacent to the phase-modulated optical signal in a wavelength range;
   said signal processing section respectively determines a state of phase modulation of said phase-modulated optical signal affected by said adjacent plurality of intensity-modulated optical signals in said optical transmission path, based on the optical waveforms detected by said optical waveform detecting section, and calculates a phase modulation drive waveform capable of canceling the respective phase modulations; and
   said phase modulating section additionally phase-modulates said phase-modulated optical signal synchronously with said adjacent plurality of intensity-modulated optical signals, according to a drive waveform of added respective drive waveforms calculated by said signal processing section.

13. A WDM optical transmission system according to claim 1, wherein said intensity-modulated optical signal is an optical signal to which is applied either one of an RZ format and an NRZ format.

14. A WDM optical transmission system according to claim 1, wherein said phase modulation method is an optical signal to which is applied any one of a DPSK format, an RZ-DPSK format, a CSRZ-DPSK format, a DQPSK format, an RZ-DQPSK format, a CSRZ-DQPSK format, and a CP-FSK format.

15. A WDM optical transmission method for transferring a WDM signal light including at least one intensity-modulated optical signal and at least one phase-modulated optical signal via an optical transmission path, said WDM optical transmission method comprising:

detecting an optical waveform of an intensity-modulated optical signal adjacent to a phase-modulated optical signal in a wavelength range;

determining a state of phase modulation of said phase-modulated optical signal affected by said adjacent intensity-modulated optical signal in said optical transmission path, based on the detected optical waveform;

calculating a phase modulation drive waveform capable of canceling the determined phase modulation; and additionally phase-modulating said phase-modulated optical signal synchronously with said adjacent intensity-modulated optical signal, according to the calculated drive waveform.

\* \* \* \* \*